June 19, 1945.  M. P. MATUSZAK  2,378,651
CATALYTIC PROCESS
Filed Aug. 24, 1940  3 Sheets-Sheet 1

INVENTOR
MARYAN P. MATUSZAK
BY
ATTORNEY

June 19, 1945. M. P. MATUSZAK 2,378,651
CATALYTIC PROCESS
Filed Aug. 24, 1940 3 Sheets-Sheet 2

INVENTOR
MARYAN P. MATUSZAK
BY
ATTORNEY

June 19, 1945.  M. P. MATUSZAK  2,378,651
CATALYTIC PROCESS
Filed Aug. 24, 1940  3 Sheets-Sheet 3

INVENTOR
MARYAN P. MATUSZAK
BY
Hudson, Young, Shanley & Yinger
ATTORNEY

Patented June 19, 1945

2,378,651

UNITED STATES PATENT OFFICE 2,378,651

CATALYTIC PROCESS

Maryan P. Matuszak, Bartlesville, Okla., assignor to Phillips Petroleum Company, a corporation of Delaware Application August 24, 1940, Serial No. 354,132

3 Claims. (Cl. 260—683.3)

This invention relates to improvements in processes and means for carrying out catalytic conversions, particularly catalytic conversions involving a considerable heat of reaction.

Many catalytic conversions involving a pronounced heat change are known; examples are dehydrogenation, hydrogenation, polymerization, depolymerization, alkylation, oxidation, reforming, desulfurization, and the like. Conversions that liberate heat are exothermic; those that consume heat are endothermic. If the conversion is a reversible one, like the catalytic alteration of carbon-to-hydrogen ratios of hydrocarbons, heat may be consumed under one set of operating conditions and liberated under another set. Thus, an increase in the carbon-to-hydrogen ratio of a hydrocarbon, which is effected by dehydrogenation, requires the consumption of heat energy, as this reaction is endothermic; but a decrease in the carbon-to-hydrogen ratio, effected by hydrogenation, liberates heat energy, as this reaction is exothermic. Among exothermic catalytic conversions may be included revivification of catalysts by burning off carbonaceous or other matter, deposited thereon during use, with an oxidizing or oxygen-containing gas.

The present invention relates to improvements in such catalytic conversions, in which a considerable heat of reaction is involved. It has both process and apparatus aspects that in general may be adequately described in connection with the catalytic changing of carbon-to-hydrogen ratios of hydrocarbons. The change in the carbon-to-hydrogen ratio may be effected by dehydrogenation, as for example in the dehydrogenation of paraffin hydrocarbons to the corresponding mono-olefins, the dehydrogenation of paraffins or mono-olefins to the corresponding diolefins, or acetylenes, or the formation of cycloolefins, cyclo-diolefins, or aromatics from aliphatic or cycloparaffin hydrocarbons, or the change may be effected by hydrogenation, as, for example, in the nondestructive hydrogenation of simple olefin polymers to the corresponding paraffins, or of aromatics to more-saturated cyclic hydrocarbons. When practicing dehydrogenation, the invention is particularly adapted to converting paraffins of two to twelve carbon atoms per molecule. Thus gaseous paraffins may be dehydrogenated to form olefins for subsequent polymerization, liquid paraffins may be dehydrogenated to improve their antiknock characteristics, and normal butane and the pentanes can be readily dehydrogenated to diolefins suitable for subsequent synthesis of resins and rubber-like materials.

However, it is to be understood that the invention is readily applicable to other reactions, such as polymerization of hydrocarbons, hydration of olefins, chlorination of hydrocarbons, desulfurization of hydrocarbons, cyclization of hydrocarbons, and the like, and it is not to be limited to any particular reaction except as specified in the appended claims.

The process of changing the carbon-to-hydrogen ratios of hydrocarbons with the aid of a chromium oxide gel catalyst has been disclosed by Huppke and Frey in U. S. Patent No. 1,905,383. Other chromium oxide-containing catalysts have been disclosed by Frey and Huppke in U. S. Patents No. 2,098,959 and 2,098,960; still others have been disclosed in the following copending applications: Morey, Serial No. 113,091 filed November 27, 1936, now Patent No. 2,288,320; Matuszak and Morey, Serial No. 173,708 filed November 9, 1937, now Patent No. 2,294,414; and Morey and Frey, Serial No. 173,709 filed November 9, 1937, now Patent No. 2,270,887. In general, these catalysts comprise unglowed chromium oxide obtained by nonspontaneous thermal decomposition of chromium compounds such as hydrated chromic oxide, ammonium-containing salts of chromic acid, and the like. These catalysts are preferred, but other suitable catalysts, such as granular alumina, or bauxite, with or without promoters such as compounds of chromium, zirconium, molybdenum, titanium, etc., may be used in some cases. Bauxite as a catalyst for the dehydrogenation and for the reforming of hydrocarbons has been disclosed by Schulze in U. S. Patent No. 2,167,602.

In the past, catalytic conversion processes involving a considerable heat of reaction have been generally carried out by passing the reactant material longitudinally through relatively small tubular catalyst chambers having a diameter of the order of 10 to 30 mm. or through narrow catalyst-containing annular or equivalent zones having a thickness of the same order. Catalyst chambers of these types are readily heated to a suitable temperature such that the catalyst is maintained at the appropriate reaction temperature by radiation and conduction of heat to or from the walls of the catalyst chamber. Many catalytic reactions in general are carried out commercially by means of converters containing a multiplicity of such relatively small and/or narrow catalyst chambers arranged in heat-exchange relationship with a temperature-controlling medium, which in some cases may be the reactant material itself. For an exothermic reaction heat is removed from the catalyst by an appropriate cooling medium, and for an endothermic reaction, heat is added to the catalyst from a heating medium, the medium in each case being in contact with the walls of the catalyst chamber. Equivalent systems in which temperature-controlling means are placed in contact with the catalyst, such as tubular members positioned within a catalyst body and containing a liquid of suitable boiling point, or other temperature-controlling medium, have also been proposed and used with some measure of satisfaction.

Such previously proposed catalytic conversion systems have a number of disadvantages, among which may be mentioned the high cost of manufacturing the many requisite chambers; the high cost of certain widely used heat-exchange media, such as mercury, diphenyl, and the like; the difficulty of making and maintaining fluid-tight connections or joints, especially in large numbers; the difficulty of removing or replacing the catalyst; and the difficulty of preventing leakage of the heat-exchange medium, which, like mercury, may be somewhat toxic as well as expensive. Nevertheless, such systems have been generally used heretofore because of the difficulty and trouble of employing large volumes of catalyst without temperature control by efficient heat exchange.

In the practice of the present invention, large contact masses may be used under substantially adiabatic conditions—that is, without any provision for efficient heat exchange—by effecting such a change in the reaction conditions in the direction of flow of the reactant material through the contact mass that it compensates at least in part for the change in the temperature of the reactant material produced by the occurrence of the reaction. This change in reaction conditions may comprise one or more of the following: a change in the activity of the contact mass in the direction of flow, a change in the time of contact of the reactant material with the catalyst as the material passes through the contact mass, and a change in the pressure of the reactant material at one or more selected points in its passage through the contact mass. The apparatus aspects of the invention involve suitable apparatus for effecting this change in reaction conditions and for the advantageous utilization of features brought out hereinafter.

It is an object of this invention to provide an improved process of carrying out catalytic conversions involving an appreciable exothermic or endothermic heat of reaction.

It is a further object of this invention to provide an improved process of carrying out catalytic conversions wherein the heat requirements of the reaction are met in an advantageous manner without the expensive and troublesome expedient of a multiplicity of relatively small tubular or narrow annular (or equivalent) catalyst chambers in heat-exchange relationship with a temperature-controlling medium.

Another object of this invention is to provide improved means for carrying out catalytic conversions involving a considerable exothermic or endothermic heat of reaction.

A further object of this invention is to provide an improved process and means for carrying out the catalytic conversion of hydrocarbons by changing their carbon-to-hydrogen ratios.

Another object of this invention is to effect a catalytic dehydrogenation of hydrocarbons in an improved manner.

With other objects and advantages that will be apparent to those skilled in the art, the invention comprises the novel features described herein, illustrated in the accompanying drawings, and particularly pointed out in the claims.

Figure 1:
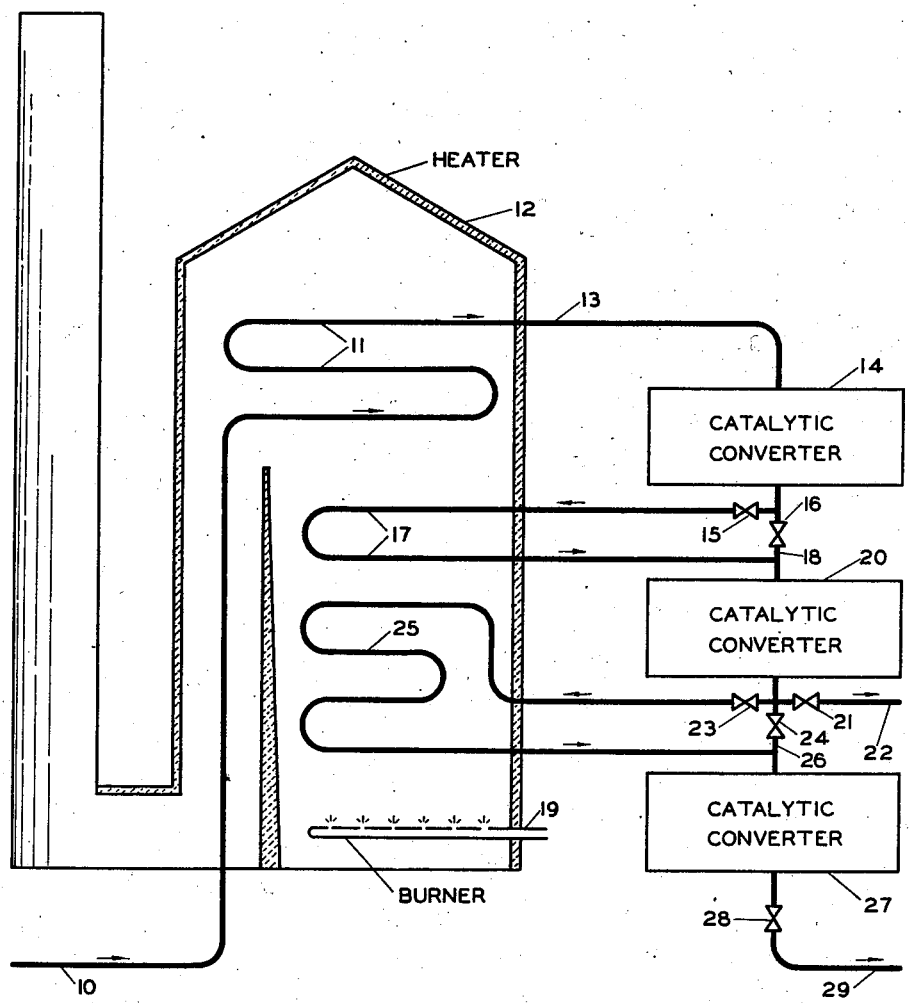
Figure 1 is a diagrammatic view of one arrangement of apparatus for practicing the invention.

Referring now to Figure 1, the reactant material that is to undergo catalytic conversion passes through inlet 10 into coil 11, which is heated in heater 12. Heater 12 may be of any conventional design or variation thereof that effects an increase in the temperature of the reactant material in coil 11 to a point at which little or no undesired homogeneous cracking or pyrolysis occurs but at which catalytic conversion takes place when the reactant material passes through pipe 13 into contact with a suitable catalytic contact mass in catalytic converter 14, which may be insulated against excessive undesirable loss of heat by any well-known means, not shown, and which is preferably of a construction more fully described hereinafter.

Ordinarily, the reactant material undergoes only a partial conversion under the substantially adiabatic conditions in converter 14. After leaving converter 14 the partially converted reactant material may be passed through valve 15 and/or valve 16 and coil 17 and/or bypass 18, of which coil 17 is in heat-exchange relationship with a heating medium, such as combustion gases from burner 19 in heater 12; and then the reactant material comes into contact with a catalytic contact mass in catalytic converter 20, wherein additional partial conversion occurs. The reaction mixture then may be withdrawn, as through valve 21 and outlet 22, or it may be subjected to one or more additional conversion steps, such as that represented by passing of the reaction mixture through valve 23 and/or valve 24 and heat-exchange coil 25 and/or bypass 26 into catalytic converter 27 and finally through valve 28 and outlet 29.

The catalytic masses in converters 20 and 27 may or may not be of the same composition and/or activity as the catalytic mass in converter 14, but in any event additional conversion is effected. The effluent from converter 20 and/or converter 27 may be used for any desired purpose or subjected to any desired separation treatment before such use, in apparatus not shown; for example, if the conversion is the production of olefins by dehydrogenation of paraffins, the effluent may be used as a feed stock for alkylation, polymerization, hydration, halogenation, or the like, while if the conversion is for the production of diolefins, such as butadiene, pentadiene, isoprene, cyclopentadiene, and the like, from the corresponding more-saturated hydrocarbons, such separation treatment may include the separation of hydrogen-containing gases and of the desired diolefins from more-saturated hydrocarbons such as paraffins and olefins, which may be returned with or without additional separation, to one or more prior dehydrogenation units. The arrangement represented by heating coil 17 and bypass 18, and by coil 25 and bypass 26, with their corresponding valves, provides an advantageous flexibility and nicety of temperature control which enhances the operation of my process. It will, of course, be understood that in place of heater 12, specifically shown, other heating means, such as heat exchangers, may be used for one or more of coils 11, 17, and 25. Also, when the process involves an exothermic reaction, one or more of the coils, especially 17 or 25, may provide cooling of the streams therein instead of heating, although generally even in such processes coil 11 will be a heating coil, so that the reactants may be initially brought to a reaction temperature.

The process may be augmented by additional conversion steps that may be incorporated in a manner that will be obvious to those skilled in the art.

For a process involving an endothermic reaction, such as the cracking or dehydrogenation of hydrocarbons, heat-exchange coils 17 and 25 of Figure 1 preferably are located in such portions of heater 12 that the material flowing therein may acquire higher temperatures than that acquired by the starting material in coil 11. This preferred positioning of the various coils in heater 12 increases the amount of sensible heat carried into converters 20 and 27 and thereby promotes a greater extent of conversion therein.

Figure 3:
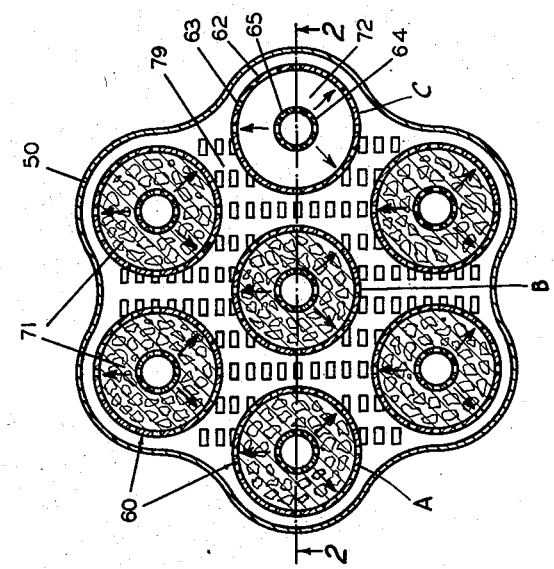
Figure 3 is a horizontal sectional view along the line 3—3 of Figure 2.
Figure 2:
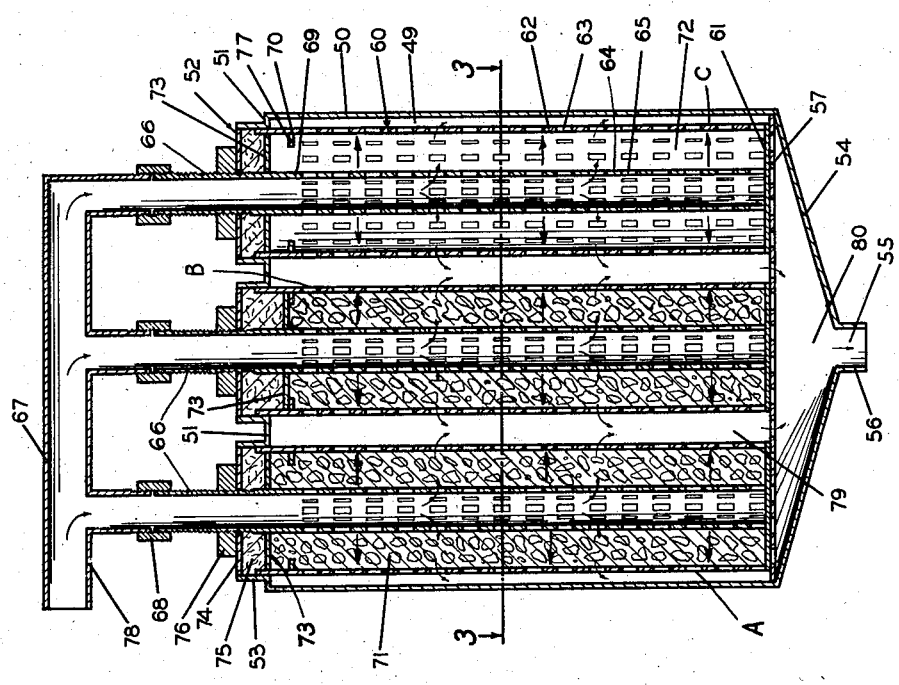
Figure 2 is a vertical sectional view of a preferred embodiment of an improved converter having particular advantages for catalytic conversions of hydrocarbons and/or other chemical compounds, and taken along the line 2—2 of Figure 3.

Figure 2 shows a sectional view taken on the line 2—2 of Figure 3 of a preferred embodiment of an improved catalytic converter suitable for use in the process outlined hereinbefore. It comprises converter chamber 49 formed by shell or casing 50, top 51 having one or more openings 52 defined by tubular projections 53, and bottom 54 having opening 55 into conduit 56. Spanning converter chamber 49 just above bottom 54 is perforated screen or rack 57, which, together with bottom 54, defines space 80. In the converter chamber are arranged removable catalyst chambers 60, corresponding in number to openings 52 and resting on rack 57. For the sake of clarity and simplicity, one such catalyst chamber C, is shown devoid of catalyst. Each catalyst chamber 60 comprises outer tube 62 having apertures 63 and having an outside diameter only slightly smaller than the inside diameter of tubular projections 53, and concentric inner tube 64 having apertures 65. Both tubes are closed at one end as by common end piece 61 or by separate end pieces, not shown, and are open at the other end. Inner tube 64 has extension 66 beyond the open end of outer tube 62; this extension is adapted at its end to be joined to manifold or header 67, as by coupling 68 or the equivalent, such as a union or a flange-type juncture, not shown. Extension 66, the relatively short portion 69 of inner tube 64 adjacent said extension, and the similarly short portion 70 of outer tube 62 adjacent its open end differ from the major portions of said tubes in being without apertures. Apertures 63 and 65 are of such size and shape as to be adapted to retain a catalytic contact mass, such as catalyst granules 71, in annular space 72 between tubes 62 and 64, while permitting flow of fluids into or out of these tubes. Further description of these apertures is made hereinafter.

The open end of tube 62 is advantageous for charging or withdrawing catalyst. In use, however, the open end of tube 62 is kept closed by any suitable means. Such means for example, may comprise washer-shaped plate 73, adapted to move up or down in the annular space between portions 69 and 70 of tubes 62 and 64; similar but somewhat larger washer-shaped plate 74, adapted to move up or down in the annular space between extension 66 and tubular projection 53; packing material 75, suitable for use at elevated temperatures, such as asbestos or the equivalent, between these two washer-shaped plates; and a compressing means adapted to compress the packing material so as to make a substantially fluid-tight closure between extension 66 and tubular projection 53 and simultaneously between portions 70 and 69 of outer and inner tubes 62 and 64, respectively. A suitable compressing means may comprise compressing nut 76 carried by extension 66, which is threaded on the outside to cooperate therewith. Washer-shaped plate 73 may rest directly against the catalytic contact mass and therefore may be positioned within the annular space between portions 69 and 70 of tubes 62 and 64, in accordance with the volume of the catalyst as shown in catalyst tube A. This arrangement is advantageous if the catalyst undergoes a change of volume, such as a shrinkage, during activation or use. Alternatively, it may rest against shelves or lugs 77 projecting from said portions, especially if the catalyst is too brittle or friable to withstand much compression, as shown in catalyst tube B.

Figure 3 is a horizontal sectional view along line 3—3 of Figure 2, the direction of sight being that of the arrows. It shows a preferred number, seven, and a preferred arrangement of catalyst chambers in which six catalyst chambers are distributed uniformly around a central catalyst chamber. Shell 50 of the converter may be fluted, as shown, but if desired, it may be circular or of any other shape. The fluted form is advantageous if more than one catalyst chamber is used because it decreases the volume of space 79 surrounding the catalyst chambers and consequently the time required for any fluid material to flow therethrough.

Figure 4:
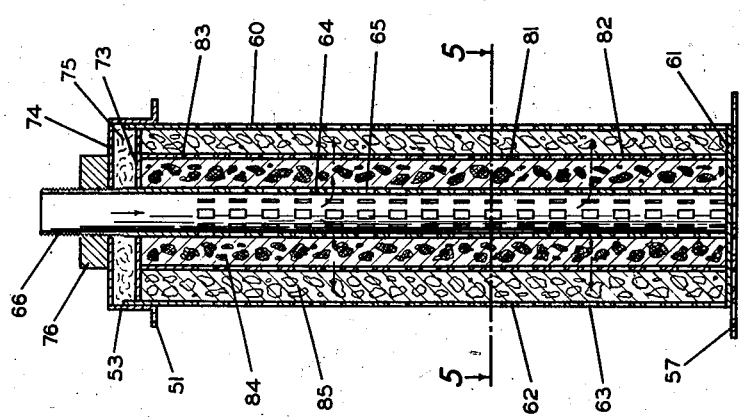
Figure 4 is a vertical sectional view of a preferred embodiment of an improved catalyst chamber.
Figure 5:
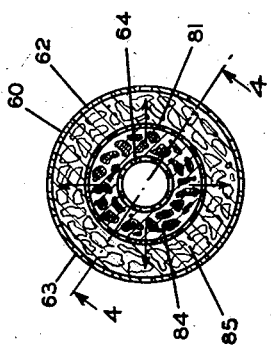
Figure 5 and 5a are horizontal sectional views along line 5—5 of Figure 4 and show different directions of flow of reactant material.

A preferred embodiment of an improved catalyst chamber is shown in the vertical sectional view of Figure 4 taken on a line 4—4 of Figure 5. It differs from catalyst chambers 60 of Figures 2 and 3 primarily in having intermediate tube 81 in the annular space between tubes 62 and 64, with which it is concentric. This intermediate tube may be closed at its lower end, as by common end piece 61, but it preferably is open, so that it may be withdrawn, if desired, without removal of the catalyst. It has apertures 82 throughout the length corresponding to the apertured portions of tubes 62 and 64. It is preferably somewhat shorter than tube 62 and also preferably stout enough to serve as a rest for plate 73, thus serving instead of shelves or lugs 77 shown in Figure 2. Adjacent its open end there may or may not be a nonapertured section 83, as may be desired. This intermediate tube separates the catalytic contact mass into two portions 84 and 85, which in general may be of different activities and/or of different compositions.

Figure 5A:
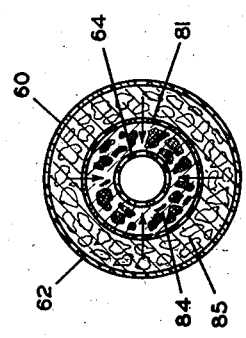

Figures 5 and 5a each depict a cross-sectional view of the catalyst chamber along line 5—5 of Figure 4 and show different directions of flow of reactant material. If it is desired to have more than two catalysts of different activities in the catalyst chamber, additional intermediate apertured tubes similar to, and concentric with, tube 81, but of different diameter, may be added to the simple arrangement shown in Figures 4, 5 and 5a.

In operation, incoming reactant material may enter manifold 67 of Figure 2, as by pipe 78, from one of the pipes 13, 18, or 26 of Figure 1, and may be subdivided into a number of streams, each of which enters a separate catalyst chamber 60 through inner tube 64. The reactant material then passes outwardly through apertures 65 in inner tube 64, transversely through catalytic contact mass 71 in space 72, and through apertures 63 in outer tube 62 into space 79 surrounding catalyst chambers 60, then through screen or rack 57 into space 80 defined by rack 57 and bottom 54, and finally out through conduit 56. The course of the reactant material in such operation is indicated by the arrows of Figures 2, 3, 4, and 5.

As the reactant material passes in this manner transversely and outwardly through the catalytic contact mass, its time of contact with each successive point of the catalyst continuously increases. Conversely, if the reactant material passes transversely and inwardly as is illustrated by the arrows of Figure 5a—that is, in a direction the reverse of the arrows of Figures 2, 3, 4, and 5—the time of contact continuously decreases as the material passes through the catalytic contact mass. This change in the time of contact gives rise to distinct advantages of control and operation.

For example, when the conversion is an endothermic one, such as dehydrogenation of hydrocarbons, the reactant material is advantageously sent transversely through the catalytic contact mass in the outward direction of the arrows of Figures 2, 3, 4, and 5. At first, when it enters the contact mass from inner apertured tube 64, the reactant material is at its maximum temperature. Hence, at first a short time of contact is adequate and is desirable from the point of view of minimizing deactivation of the catalyst. But, as soon as the reactant material has penetrated into the catalytic contact mass and some reaction has taken place, the temperature of the reactant material decreases, because of the endothermic nature of the reaction, and then an increase in the time of contact becomes desirable and advantageous. This increase is effected continuously and in an unusually simple manner; as the temperature decreases during the passage of the reactant material through the catalytic contact mass, the time of contact correspondingly increases, thereby advantageously contributing to higher and more uniform over-all conversion yields and less rapid deactivation of the catalytic contact mass.

The relative time of contact at any point in the contact mass may be readily calculated. If the reactant material flows through the catalytic contact mass in the outward direction of the arrows of Figures 2, 3, 4, and 5, then, if any effect of volume changes caused by the reaction is neglected, the relative time of contact at any point will be proportional to the diameter of the circular cross-sectional space that has been traversed.

Thus, if outer tube 62 of the catalyst chamber is 12 inches in diameter and if inner tube 64 is 1 inch in diameter, the relative time of contact of the material with the catalyst immediately before leaving the bed of catalyst at the outer tube is twelve times as long as that on entering the bed at the inner tube. In a catalytic chamber having an outer tube 20 inches in diameter and an inner tube 2 inches in diameter, the time of contact just before the reactant material leaves the catalytic contact mass at the outer tube is ten times that just after it entered the catalyst bed. Similarly, the relative average time of contact as the reaction material passes through any particular annular zone in the catalytic contact mass may be readily calculated, for it varies with the area of the cross section of the particular annular zone in question. Thus, in the last-mentioned catalyst chamber, the ratio of the average time of contact in the outermost inch of catalyst to that in the innermost inch of catalyst is $$(314.16 - 283.53) : (7.07 - 3.14) = 7.8 : 1$$

Conversely, when the reactant material is passed through the catalytic contact mass in the direction opposite to that of the arrows in Figures 2, 3, 4, and 5, the time of contact decreases as the reactant material traverses the contact mass. Thus in the two catalyst chambers of outer tubes having diameters of 12 and 20 inches and inner tubes of 1 and 2 inches, respectively, the time of contact at the moment of leaving the catalytic contact mass will be $\tfrac{1}{12}$ and $\tfrac{1}{10}$ of that at the moment of entering the catalytic contact mass, respectively. This situation is highly desirable for carrying out exothermic reactions, for as the temperature of the reactant material is increased because of the exothermic nature of the reaction and as the material passes inwardly through the catalytic contact mass, the time of contact is made to decrease in a corresponding, compensatory, and advantageous manner.

This feature is especially of high usefulness if the catalytic contact mass comprises two or more catalysts, each in a separate annular catalyst-containing space such as those indicated in Figures 4, 5, and 5a. The catalysts in general will be of different activities, and hence additional control of reaction conditions is obtained by selection of the sizes of the annular spaces and of the catalysts placed therein. Thus, a catalyst of relatively high activity may be placed in an inner annular space, where the corresponding time of contact is short, and a catalyst of lower activity in an outer annular space, where the time of contact is relatively long. For example, in the dehydrogenation of paraffin hydrocarbons, the inner catalyst may be a highly active catalyst such as one or more of the chromium oxide-containing catalysts mentioned hereinbefore, and the outer catalyst may be a less highly active catalyst, such as bauxite or activated alumina, with or without promoters such as compounds of chromium, zirconium, molybdenum, titanium, etc., which requires higher temperature and/or a longer time of contact to effect a profitable or desirable degree of dehydrogenation. A particularly advantageous arrangement for the dehydrogenation of hydrocarbons is an outermost zone of granular dehydrated bauxite, an intermediate zone of granular bauxite impregnated or coated with chromium oxide, and an innermost zone of a granular catalyst comprising chiefly black unglowed chromium oxide. The reactant material may be passed transversely through the catalyst chamber in an inward direction, so that it is subjected to the catalytic action of the bauxite while at a relatively high temperature. After passing through the bauxite, the material, now cooled considerably because of the endothermic nature of the reaction, is passed through the progressively more active inner catalysts, to effect further conversion within thermodynamic limits. In this manner, advantageous conditions of conversion are obtained and each catalyst is profitably used in turn at appropriate values of temperature and times of contact without the disadvantages attendant upon the use of only one catalyst, such as excessively rapid deactivation because of too high a temperature or undesirably low conversion because of too low a temperature in portions of the contact mass.

A similar arrangement of highly active and less-active catalysts is advantageously useful for exothermic reactions such as the hydrogenation of olefinic or other unsaturated hydrocarbons to paraffins or relatively more-saturated hydrocarbons. For example, a relatively highly active hydrogenation catalyst such as a nickel catalyst may be placed in an inner annular zone of the catalyst chamber and a relatively less active hydrogenation catalyst like a chromium oxide-containing catalyst in an outer annular zone. The reactant material, comprising unsaturated hydrocarbons and hydrogen, is then passed transversely in an outward direction through the contact mass comprising the two catalysts. The partial hydrogenation effected in the inner zone by the relatively highly active catalyst heats up the reactant material to a temperature at which, because of the increased time of contact in the outer zone, the relatively less active catalyst effects a desirable further degree of hydrogenation, within thermodynamic limits.

The temperature to which the reactant material is heated before being subjected successively to the action of each of a plurality of catalysts of progressively varying activities depends somewhat upon the reactant material and upon the catalysts. For example, in the dehydrogenation of a butane, a temperature in the range of 1050 to 1200° F. is appropriate if the first catalyst in the series is granular bauxite. The temperature may decrease to between about 1070° F. and 1000° F. as the butane passes through the bauxite; then it may decrease to about 930° F. if it passes through an intermediate zone of granular bauxite impregnated with chromium oxide; and finally it may decrease to about 840° F. if it passes through a final zone of granular black unglowed chromium oxide. Somewhat higher temperatures are advantageous for the dehydrogenation of propane or ethane, and somewhat lower temperatures for the dehydrogenation of paraffins heavier than butane; in general, a suitable initial temperature for the dehydrogenation of any particular paraffin may be readily found by trial by one skilled in the art, in the light of the present teachings.

By suitable choice of the diameters of the concentric apertured tubes of the catalyst chambers, the range variation of the relative times of contact of the reactant material with the catalytic contact mass therebetween may be made as great or as small as may be desired for the optimum operation of particular catalytic conversions. In general, however, the ratio of the maximum diameter to the minimum diameter in any one catalyst chamber should exceed about 2:1. If a ratio much smaller than this is used, the advantages attendant upon a change in the time of contact as the reactant material traverses the catalytic contact mass tend to disappear; such advantages are nonexistent in catalyst chambers of the prior art in which the reactant material is passed longitudinally through a catalyst bed in a tubular or annular or equivalent container wherein the time of contact remains virtually unchanged throughout the catalyst bed.

The apertures of each of the two or more concentric tubes of the catalyst chambers, such as tubes 62, 64, 81, etc., preferably should be uniformly distributed throughout the apertured portions thereof in order to provide uniform distribution of fluid reactant material flowing therethrough. Furthermore, the apertures in one of the concentric tubes preferably should be of such size and number as to possess an aggregate resistance to flow of fluids therethrough that is greater by a factor of about two to ten, or more, than the aggregate resistance presented by the apertures in the one or more other concentric tubes and by the catalytic contact mass. Thereby the distribution of the reactant material is made completely uniform and independent of any disturbance caused by undesired packing or channeling of the contact mass. The rate of flow of the reactant material through each individual catalyst chamber and through any particular portion of any particular contact mass is then governed mostly by the apertures having said greater aggregate resistance and only to a minor or relatively unimportant degree by the resistance of the contact mass, which therefore may vary widely without appreciable effect upon the conversion yield and/or products.

Another advantage of a relatively high aggregate resistance to fluid flow through the apertures of one of the concentric tubes of catalyst chambers 60 is that the pressure may be readily controlled to suit the reaction or catalyst in hand. Thus, if the tube through the apertures of which the reactant material enters the bed of catalyst—which may be either tube 62 or 64, depending upon the direction of flow—has the relatively high resistance to fluid flow, the pressure within the catalyst bed is much lower than that of the material before reaching the catalytic contact mass. In this manner, a relatively high pressure, such as the vapor pressure, at normal temperatures, of a liquefied normally gaseous reactant material, may be conveniently decreased to a relatively low pressure, which on thermodynamic grounds is of considerable advantage for certain reactions, such as dehydrogenation, depolymerization, cracking, or the like. In the case of certain other reactions, such as hydrogenation and polymerization, for which it is advantageous to use as high a pressure as is practicable, the tube whose apertures have the relatively high aggregate resistance may be that through which the reactant material leaves the catalyst bed. In still other cases, it is advantageous that the tube having the relatively high resistance be an intermediate tube, such as tube 81, whereupon on one side of said tube a relatively high pressure and on the other a relatively low pressure are established. The catalysts on the two sides of such an intermediate tube may be of the same or of different activities, but it is generally preferable to place the more active of two catalysts on the low-pressure side. For example, in the dehydrogenation of hydrocarbons, a relatively high pressure of about 75 to 150 pounds per square inch, or more, may be used to provide a relatively long contact time with a catalyst like bauxite or alumina, which produces an extent of reaction that is far from equilibrium; and a low pressure of about 75 pounds per square inch or less on the other side of the tube correspondingly will provide a relatively short contact time that is still sufficiently long for the relatively highly active chromium oxide-containing catalysts mentioned hereinbefore to bring the reaction substantially to equilibrium, the equilibrium being more favorable and advantageous at low pressures, from the point of view of conversion yield, than at high pressures. Such a procedure just described is especially feasible in the conversion of normal butane or the pentanes to diolefins. Thus, normal butane may be initially dehydrogenated to an extent of about 10 to 20 per cent under a pressure of about 50 to 100 pounds per square inch gauge in the first of two concentric annular contiguous catalyst zones, the initial temperature being 1050 to 1150° F., with a drop in pressure to about 5 pounds gauge and continued dehydrogenation in a second catalyst zone.

Figure 6:
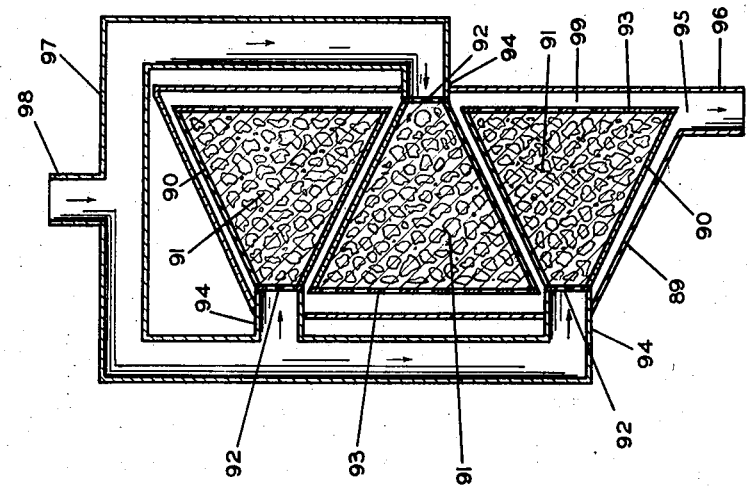
Figure 6 is a horizontal sectional view of an alternative embodiment of an improved converter.

Figure 6 shows a horizontal sectional view of an alternative embodiment of my improved converter. Inside converter shell 89 are shown three catalyst chambers 90, each filled with catalytic contact mass 91, but any desired number of similar chambers may be used, and the catalytic contact mass may comprise catalysts of more than one composition and/or activity. In one modification, each catalyst chamber is constructed of six plane sides, and its cross section, in the plane of Figure 6, is a trapezoid, as shown. The two parallel sides 92 and 93 defining the trapezoidal cross section are apertured, one serving as inlet and the other as outlet for the reactant material; these may vary in dimensions to effect any desired variation in contact time of the reactant material with the catalytic contact mass. The other four sides of the catalyst chamber are imperforate. Appropriate connections 94 and 95 pass through converter shell 89 to and from the catalyst chambers. Connections 94 serve to connect the small apertured sides of the catalyst chambers with manifold or header 97, which in turn is connected to conduit 98; connection 95 connects the large apertured sides with conduit 96. In operation, the reactant material may flow in the direction of the arrows; that is, it may pass from conduit 98 into header 97 whereby it is subdivided into a number of streams flowing in parallel through connections 94 into catalyst chambers 90. On passing through catalytic contact masses 91 from apertured sides 92 to larger apertured sides 93, the reactant material experiences an increase in its time of contact with each successive portion of the contact mass. After leaving the catalyst chambers, the streams of reacted material recombine in converter chamber 99 and pass therefrom through opening 95 into conduit 96. If desired, the reactant material may be passed in the direction opposite to that of the arrows, whereupon the time of contact decreases as the reactant material passes through catalytic contact masses 91 from apertured sides 93 to apertured sides 92. In the embodiment shown in Figure 6, the distance of flow from one apertured side of a catalyst chamber to the other is not everywhere constant; if a constant distance between the apertured sides is desired, the larger or both of the apertured sides may be made of portions of tubes of appropriate diameters instead of planes, so that a cross section of the catalyst chamber in the plane of Figure 6 would resemble a sector of a circle.

Catalyst chambers 90 may be divided into a plurality of sections by one or more apertured partitions, not shown, between and parallel to apertured sides 92 and 93, and catalysts of different activities may be used in the sections. Similarly, one of the apertured sides or partitions may have apertures of such size and number as to possess a relatively greater aggregate resistance to fluid flow than that presented by the other apertured sides and the catalytic contact mass, to obtain advantages similar to those already described for the embodiment illustrated in Figure 4.

Some of the principles of apparatus design and use illustrated and discussed in the foregoing may be considerably extended beyond the preferred embodiments shown in the drawings. For example, one embodiment comprises two concentric substantially spherical perforated shells, adapted to retain a granular catalytic contact mass therebetween, and a surrounding substantially spherical casing imperforate except for an opening to a conduit and for a tubular connection passing through it, through the outer perforated shell, and through the catalyst-containing space to the inner perforated shell. The casing and the outer perforated shell must be provided with ports or other means through which the catalytic contact mass may be charged to the converter, or through which it may be withdrawn. In use, a reactant material passes either inwardly or outwardly through the catalytic contact mass, as may be best suited to the reaction taking place, and the relative time of contact at any point is proportional to the square of the diameter of the sphere containing the point. If desired, one or more additional intermediate perforated spherical shells dividing the catalytic contact mass may be incorporated in the converter; likewise, the perforations in any one of the perforated spherical shells may be made to have an aggregate resistance to flow of fluids therethrough that is considerably greater than the aggregate resistance presented by the perforations of the other shells and by the catalytic contact mass.

The foregoing describes improvements in process and means for carrying out catalytic conversions involving a considerably exothermic or endothermic heat of reaction. The heat requirements of the reaction are met in an advantageous manner without the expensive and troublesome expedient of a multiplicity of relatively small tubular or narrow annular, or equivalent, catalyst chambers in heat-exchange relationship with a temperature-controlling medium. Advantageous combinations of preheating and/or intermediate heating or cooling steps are used for adjusting the temperature and the course of reaction of the reactant material. In the preferred apparatus described, the reactant material flows transversely through a relatively large body of catalyst in a relatively large annular or annularly subdivided catalyst chamber, instead of longitudinally as in the usual relatively small tubular or narrow annular catalyst chambers, wherein much larger proportions of available space are devoid of catalyst or wherewith temperature-controlling media are employed. A number of advantages that have been indicated in the foregoing or that will be obvious to those skilled in the art accrue from the use of such a process, such as the utilization of different reaction temperatures at different points in the catalytic contact mass, the utilization of a continuously varying time of contact between the reactant material and the catalyst, the utilization of a plurality of catalysts of different activities for the same reaction, the utilization of different pressures in one catalytic converter, and the like.

Many modifications and/or variations of the invention will be obvious to those skilled in the art. For example, certain of the novel process and apparatus aspects of the invention obviously may be advantageously employed in catalytic conversions involving compounds exclusive of hydrocarbons, and such employments therefore are not to be excluded from the scope of the invention, except as specified in the appended claims. As another example, it will be obvious that some additional control of the time of contact of reactant material with the catalytic contact mass may be effected, if a plurality of catalysts of different activities are used in the apparatus described, by interposing an intermediate annular zone devoid of catalysts between the different catalyst-containing annular zones. Hence, it is to be understood that, within the scope of the claims, the invention is extensive in modifications and equivalents.

Reference is made to my copending divisional application Serial No. 428,425, filed January 27, 1942, in which is claimed subject matter that is disclosed but not claimed herein.

I claim:

1. A process for the endothermic catalytic dehydrogenation of a hydrocarbon, which comprises passing a hydrocarbon at a temperature at which catalytic dehydrogenation normally results, through a plurality of catalysts of different catalytic activities contained in a substantially adiabatic reaction chamber that is free from heat-exchange relationship with temperature-controlling media, said catalysts being disposed in at least three concentric annular zones arranged successively and contiguously relative to the direction of flow of said hydrocarbon, one of said concentric zones containing such an amount of a granular bauxite catalyst as to decrease the temperature of the hydrocarbon to within the range of approximately 1000° to approximately 1070° F., another of said concentric zones containing such an amount of a bauxite-supported chromium oxide catalyst as to decrease the temperature of the hydrocarbon to approximately 930° F., and another of said concentric zones containing such an amount of black unglowed chromium oxide catalyst as to decrease the temperature to approximately 840° F.

2. A process for the catalytic dehydrogenation of a butane, which comprises passing a butane at a temperature within the range of approximately 1050° to approximately 1200° F. through a plurality of catalysts of different catalytic activities contained in a substantially adiabatic reaction chamber that is free from heat-exchange relationship with temperature-controlling media, said catalysts being disposed in three concentric annular zones arranged successively and contiguously, in accordance with an outward direction of flow of said butane, the first or innermost of said concentric zones containing such an amount of a granular bauxite catalyst as to decrease the temperature of the butane to within the range of approximately 1000° to approximately 1070° F., the second or intermediate of said concentric zones containing such an amount of bauxite-supported chromium oxide catalyst as to decrease the temperature to approximately 930° F., and the third or outermost concentric zone containing such an amount of black unglowed chromium oxide catalyst as to decrease the temperature to approximately 840° F.

3. A process for the catalytic dehydrogenation of a butane, which comprises passing a butane at a temperature within the range of approximately 1050° to approximately 1200° F. through a plurality of catalysts of different catalytic activities contained in a substantially adiabatic reaction chamber that is free from heat-exchange relationship with temperature-controlling media, said catalysts being disposed in three concentric annular zones arranged successively and contiguously, in accordance with an inward direction of flow of said butane, the first or outermost of said concentric zones containing such an amount of a granular bauxite catalyst as to decrease the temperature of the butane to within the range of approximately 1000° to approximately 1070° F., the second or intermediate of said concentric zones containing such an amount of bauxite-supported chromium oxide catalyst as to decrease the temperature to approximately 930° F., and the third or innermost concentric zone containing such an amount of black unglowed chromium oxide catalyst as to decrease the temperature to approximately 840° F.

MARYAN P. MATUSZAK.